United States Patent
Hata

(10) Patent No.: US 7,435,317 B2
(45) Date of Patent: Oct. 14, 2008

(54) DESALINATION OF OCEAN WATER

(75) Inventor: Seiji Hata, Tokyo (JP)

(73) Assignee: Biomass Conversions, L.L.C., Los Angeles, CA (US)

( * ) Notice: Subject to any disclaimer, the term of this patent is extended or adjusted under 35 U.S.C. 154(b) by 561 days.

(21) Appl. No.: 10/240,431

(22) PCT Filed: Mar. 29, 2001

(86) PCT No.: PCT/US01/10574

§ 371 (c)(1),
(2), (4) Date: Dec. 29, 2003

(87) PCT Pub. No.: WO01/74721

PCT Pub. Date: Oct. 11, 2001

(65) Prior Publication Data

US 2004/0084156 A1    May 6, 2004

(30) Foreign Application Priority Data

Mar. 31, 2000  (JP) .............................. 2000-096811

(51) Int. Cl.
*B01D 3/38* (2006.01)
*B01D 3/42* (2006.01)
*B01D 3/10* (2006.01)
*C02F 1/04* (2006.01)

(52) U.S. Cl. ................ 203/10; 159/48.1; 159/DIG. 16; 159/DIG. 20; 202/160; 202/205; 202/236; 203/11; 203/12; 203/14; 203/2; 203/90; 203/92; 203/95

(58) Field of Classification Search ................... 159/44, 159/48.1, DIG. 16, DIG. 20; 202/160, 205, 202/236, 265; 203/2, 10, 11, 12, 14, 90, 203/92, 95
See application file for complete search history.

(56) References Cited

U.S. PATENT DOCUMENTS

| | | | | | |
|---|---|---|---|---|---|
| 2,764,533 | A | * | 9/1956 | Wilhelm et al. | 203/80 |
| 2,929,106 | A | * | 3/1960 | Snow | 264/14 |
| 3,290,231 | A | * | 12/1966 | Ries, Jr. et al. | 203/10 |
| 3,946,110 | A | * | 3/1976 | Hill | 514/161 |
| 5,183,540 | A | * | 2/1993 | Rubin | 203/41 |
| 5,429,247 | A | * | 7/1995 | Lemay et al. | 209/17 |
| 5,624,530 | A | * | 4/1997 | Sadykhov et al. | 159/3 |
| 2005/0255779 | A1 | * | 11/2005 | Mizutani et al. | 442/411 |

* cited by examiner

*Primary Examiner*—Virginia Manoharan
(74) *Attorney, Agent, or Firm*—Venable LLP; Stefan J. Kirchanski

(57) ABSTRACT

An improved distillation of water. involves distilling significant quantities of water at temperatures well below the boiling point. During distillation, a compound is taken from a liquid-phase to a gas-phase and then condensed to the liquid-phase again to get a pure liquid. The present invention uses water sprayed (105) and absorbed onto a solid surface such as micro-powder (104) made from wood as a starting material. Absorbing water onto such a surface results in rapid evaporation with a relatively low temperature gradient when the water and particles are agitated. The present invention could be characterized as solid-phase distillation.

20 Claims, 1 Drawing Sheet

DESALINATION OF OCEAN WATER

BACKGROUND OF THE INVENTION

1. Area of the Art

The present application concerns desalination of ocean water and specifically a new method to get pure water easily.

2. Description of the Prior Art

The world faces serious water problems. The increased warming of the ocean surface brought on by increases in atmospheric carbon dioxide and other "greenhouse gases" is a big problem for island countries. Increasing temperatures cause the oceans to rise as polar ice caps melt. This may drown the islands. Meanwhile, elevated water temperatures damage the coral reefs so that island dwellers also face a shortage of food. At the same time increases of atmospheric temperature promote desertification. Desert dwellers lack water for direct consumption and for agriculture. Desert dwellers also face a food shortage. Both of these problems are environmental. All living things contain water as a major constituent of their bodies. Most biological functions and many biological structures depend on water and are not possible under a dry or dehydrated state. "Dry" means "death" for most living creatures.

Therefore, the problem of water shortage is very important for all humans. By the middle of the twenty second century it is estimated that world population will exceed 10 billion. This rapid increase in the world's population will increase the already intense competition for water, food and energy. These problems are closely related to each other and are not readily separable.

Most water on Earth is ocean water (seawater). Pure water exists in ice (glaciers and snow), rain, rivers, ponds, lakes, and underground aquifers. The agriculture use of water depends on the above-mentioned water sources. Unfortunately, many aquifers contain water rich in minerals that accumulate in the soil following prolonged irrigation. This accumulation causes the so-called "salt injury" to plants. Where the water is high in sodium, the actual structure of the soil is damaged as sodium replaces calcium in clay minerals.

The 97.5% of the planet's water is ocean water, which cannot be used agriculturally without the removal of salt—desalination. There are basically two popular desalination processes: distillation and membrane separation. Distillation is a process in which water molecules evaporate from seawater and are subsequently condensed as pure water. The membrane separation process involves either "electron dialysis" (the ED method) or "Reverse Osmosis" (the RO method).

Distillation yields pure water and the residue from this process is salt. The membrane processes ED and RO trap ions and salts so the residue is pure water. Distillation requires much energy for heating the water to accelerate evaporation whereas and the membrane processes require expensive membranes.

The practical problem of the desalination of ocean water is one of performance at an industrial level since such huge amounts of water are needed for agriculture on a scale that can convert the deserts into green plantations. Photosynthesis is the only significant process by which living organisms capture solar energy and store it by synthesizing glucose from carbon dioxide and water. It is a well-known rule of thumb that the growth of agricultural crops requires a weight of water about one thousand times the weight of the harvested crop.

Standard ocean water contains about 3.4 weight % of salts with a pH of 8. The most prevalent anions are the chloride ion (19,000 mg/l) and the sulfate ion (2,600 mg/l). The common cations are the sodium ion (10,650 mg/l), the magnesium ion (1,300 mg/l), the calcium ion (400 mg/l) and the potassium ion (380 mg./l.) There are also lower levels of the bromide ion, the carbonate ion, the boron ion and the strontium ion. In addition there are traces of iron, silica, and calcium carbonate.

Each of these ions has a diameter of several Angstroms ($10^{-10}$ m). The hydrated ions are in the same dimensional order of magnitude. The separation efficiency of the membrane desalination processed is owed to the ion trapping ability and the ion permeability of the membranes. The affinity and the pore sizes of the membranes are key to the separation results. The manufacture of the membranes must be carefully done and special polymers are required. For the ED method ion-exchange polymers are favored whereas for the RO method cellulose acetate and similar neutral polymers are preferred. Modification of the polymer matrix, for example by cross-linkage and side-chain modification, has been tried to improve efficiency. Nevertheless, it is still difficult to remove all ions.

On the other hand, the distillation method is a standard laboratory method for separation of a liquid from various contaminants. After the removal of particulate matter, ocean water is boiled and evaporated. The resulting steam is then cooled to condense it into liquid water. The common fractional distillation tower is able to yield a large amount of pure water. The problem is to use energy efficiently. A number of technologies attempt to decrease the total number of calories needed to distill pure water from ocean water.

For producing drinking water it is necessary to remove essentially all ions, because our body already contains a critical balance of most of the ions found in ocean water and can be damaged by additional ions. For use in agriculture it is also necessary to remove essentially all ions. As mentioned above, the accumulation of salts in agricultural lands renders the soil non-arable so that the farmer must give up cultivation of the affected land. In the world there are many regions where this has already occurred. There are a myriad of problems resulting from shortage of water—formation of deserts, salt injury to agriculture, as well as lack of drinking water. These problems necessitate complex systems for the long-distance transport of water as well as "water wars" when water is taken from one region to benefit another.

SUMMARY OF THE INVENTION

The present invention is a new process for desalinating ocean water through evaporation to yield pure salt-free water. Essentially, the process consists of the evaporation of water from the surface of a solid surface while applying energy as heat and/or stirring. The ocean water pre-heated by the sun and/or other energy sources is introduced into a container and sprayed onto the surface of a fine particulate material that has large surface area. Interaction of the water molecules with the surface accelerates evaporation. This allows significant evaporation with a lower energy input than conventional distillation. Following evaporation the water vapor is condensed to yield pure water. The resulting water is acceptable for agricultural use as well as for drinking.

DETAILED DESCRIPTION OF THE INVENTION

Figure 1:
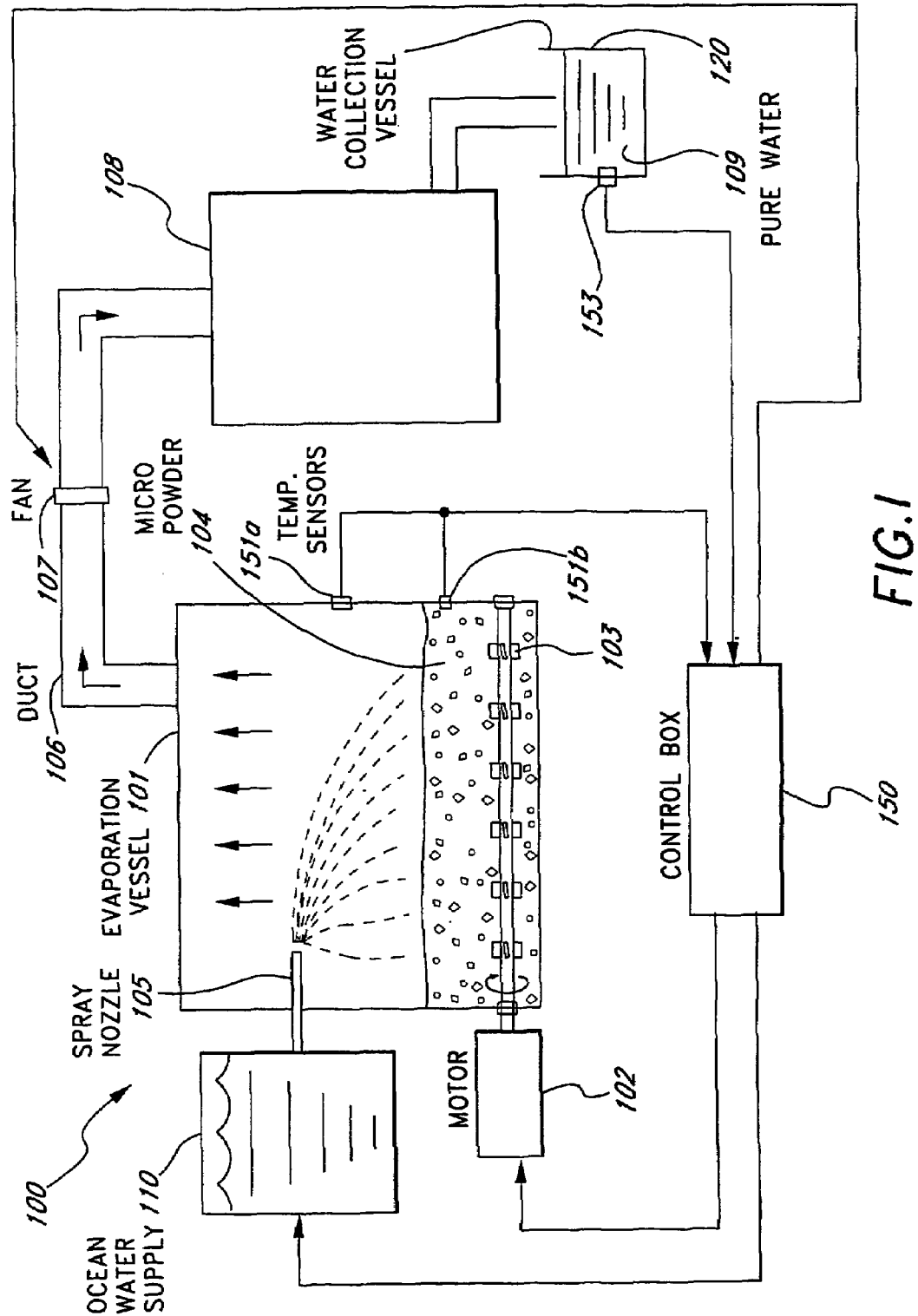
FIG. 1 is diagrammatic representation of the present invention.

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a process that enhances evaporation from ocean water by combining the ocean water with a particulate material.

In nature water circulates through the environment in three physical states—solid, liquid, and gas. Water evaporates from land or from the surface of bodies of water in response to warming by the sun. The resulting water vapor circulates through the atmosphere and collects as clouds. Upon sufficient cooling the water condenses from the clouds and falls as rain or snow. The evaporation from land or water surface is not dependent on a great gradient in temperature. Rather the large scale of the surfaces involved make it possible for a modest rise in surface temperature to result in the distillation of massive amounts of pure water from the Earth's surface. The present inventor has realized that by greatly multiplying the evaporative surface it is possible to greatly enhance the rate of evaporation of water. In thinking of evaporation from the huge surface area of the oceans one can consider the evaporative area as being two-dimensional. The two-dimensional area is in reality a three-dimensional area. The whole surface area of the Earth (509,949,000 km$^2$) can be essentially converted to the surface area of a plurality of small particles by the following equations.

Here S=the surface area, V=the volume, W=the weight, D=the density and R=the radius of the Earth. Similarly, s=the surface area, v=the volume, w=the weight, d=the density and r=the radius of an aggregate plurality of small particles (micro-powder) that are used to substitute for the Earth's surface.

$$S=4\pi R^2 \quad (1)$$

$$s=4\pi r^2 \quad (2)$$

Allowing S to equal the total sum of the surface areas (s) of a plurality (n) of particles (S=n×s)

$$n = \frac{S}{s} = \left(\frac{R}{r}\right)^2 \quad (3)$$

$$V = 4/3\pi R^3 \quad (4)$$

$$v = 4/3\pi r^3 \quad (5)$$

$$\frac{V}{v} = \left(\frac{R}{r}\right)^3 \quad (6)$$

$$W = 4/3\pi R^3 \cdot D \quad (7)$$

$$w = 4/3\pi r^3 \cdot d \quad (8)$$

Taking n from (3) we derive $$n \cdot W = \left(\frac{R}{r}\right)^2 \times \frac{4}{3}\pi r^3 \times d = \frac{4}{3}\pi \times R^2 \times d \quad (9)$$

The Earth's radius R=6.37×10$^6$ m. Therefore:

$$nW = 8.5 \times 10^{16} \times r \; kg \; [r: [m]] \quad (10)$$

If the density D of the Earth is 5.5 g/cm$^3$, the weight W is about 5.97×10$^{24}$ metric tons using equation (7). However, using equations (9) and (10) it is possible to calculate the weight of micro-powder that has a combined surface area equal to that of the Earth. Assuming that the micro-powder is cellulose with a density of 0.5 g/cm$^3$, one can calculate that for micro-particles having a radius r of 1 cm, the weight of micro-powder having the surface area of the Earth is about 8.5×10$^{11}$ metric tons. When r is reduced to the micrometer range (1×10$^{-6}$ m), the weight becomes 8.5×10$^7$ metric tons.

This gives an indication of how tremendous is the surface area of small particles. By using small particles it is possible to essentially duplicate the entire evaporative surface area of the Earth with a "relatively A preferred material is fine cellulosic powder produced by exhaustive disruption of wood cellulose. Saw dust and similar cellulosic waste materials can be mechanically disrupted by a process of continued grinding and stirring to provide such a material.

As will be explained below, interaction of the water molecules with the particle surface provides another significant improvement in efficiency. A weight of micro-powder that is orders of magnitude below the figure calculated above is actually capable of duplicating the evaporative capacity of the entire Earth. This makes it possible to make a relatively small but very efficient evaporative system using micro-powder.

Free-Water

In understanding the additional efficiencies provided by micro-powder, it is first necessary to consider the state of water. Water is, perhaps, the most basic compound in chemistry. The structure of water makes it ideal for a type of intramolecular interaction popularly known as "hydrogen bonding". Because of this interaction liquid water exists in a quasi-polymeric state where individual water molecules are linked to form a "cluster". The specific heat, boiling point, freezing point and related physical properties of water show very different values when compared to similarly sized molecules that do not exhibit hydrogen bonding. The boiling point of 100° C. is often used for illustration of the hydrogen bond phenomenon. Water vapor, the gaseous stage of water, exists as mono- or di-water molecules. The heat required for vaporization of liquid water represents the overall energy required to move the molecules from polymeric "cluster" state to the vapor state wherein clusters are replaced by water monomers or dimers. The specific heat of water is 4.3 j/g·K under standard conditions. The normal isotropic bulk water is called "free water". This means water-water molecular interactions are the same in all directions. If a hydrophilic compound is introduced into the system, the water-water interactions change slightly. The effect of added ions is an example of this effect. An ion dissolved in the water becomes hydrated; this means that an additional interaction is added—namely the ion-water interaction. This interaction is not large, so the specific heat of seawater is reduced only to 3.9 J/g·K. However, it is important to note that another force is able to change water-water interaction. The ion-water interaction is weak, and relaxation time for the interaction is short. The interaction of a water molecule with an ion not affected by other water molecules, so it becomes easier to heat to the water molecule. Bound water is another state of water in which the water-water interactions are disrupted. A completely hydrated molecule contains immobilized water or associated tightly bound water. Water interactions can also be disrupted by hydrophobic materials. Strongly hydrophobic particles such as those of poly-teterafluoroethylene can also be effective in the present invention. At the present time IR, Raman, or Nuclear Magnetic Resonance Spectrometry can distinguish these various states of water experimentally.

The interaction of water-water and water-other molecule shows that it is possible to alter the heat transfer characteristics of the water molecule. Weakening the water-water interactions can lower the amount of energy needed to convert water from a liquid to a gas. The surface of a small particle is optimal for producing interactions that change the amount of energy needed to evaporate water. That is, the energy needed to evaporate a water molecule can be reduced by the reducing the water-water interaction.

The most effective materials for this purpose appear to be hydrophilic compounds such as natural polysaccharide macromolecules found in plant materials such as wood, paper, bamboo, and rice straw as well as proteins and inorganic metal oxides such as silica (silicon dioxide), alumina (aluminum oxide). titania (titanium dioxide), magnesia (magnesium oxide), iron oxide, other metal oxides, clays, etc.

The source of energy for the evaporative process is not critical. Energy can be supplied as normal convective or conductive heating, or radiative heating by visible, infrared, or microwave radiation or simply by sunshine. Another method is a mechanical heating through friction (e.g., by stirring).

Free water exhibits strong water-water interaction and much energy is needed to overcome the interaction and convert liquid water to the vapor. To weaken the interaction water-water is an important way of reducing the amount of energy needed to evaporate water.

Vapor Removal

There is a normal vapor-liquid equilibrium between water vapor and liquid water. This characteristic of the invention is concerned with the promotion of a non-equilibrium condition. The evaporation of ocean water is controlled by the vapor-liquid equilibrium under constant temperature and pressure conditions. Reducing the pressure is another way to promote an increase in the rate of evaporation. In a closed system vapor pressure of water $p_1$ and atmospheric pressure $p_2$ combine to yield the equilibrium pressure p. The vessel volume affects this pressure at a given temperature because the vessel's volume controls the total vapor volume in such a closed system. If the water vapor is allowed to flow into a condenser to be converted into liquid water, the vapor pressure of water $p_1$ is reduced in the system and evaporation is promoted. A fan can be provided in an evaporation system to promote circulation of the water vapor into the condenser.

FIRST EXAMPLE

FIG. 1 shows a diagrammatic representation of a device 100 to carry out the process of the present invention. A control box 150 contains a microprocessor or other similar control system to control the device in response to a vapor temperature sensor 151a and a liquid temperature sensor 151b and a water level sensor 153. The control box 150 controls a heater (not shown) to raise the temperature of the vessel 101. The control box 150 also controls a stirring motor 102 and a saltwater sprayer 105 as well as a circulating fan 107. Seawater is stored in a supply container 110 and is sprayed into an evaporation vessel 101 to maintain the level of fluid therein. Generally, the seawater is heated prior to being sprayed by heating the entire container 110 or by heating the sprayer 105. Waste or solar heat are especially preferred so that the system converts waste energy into pure water. The sprayer 105 produces a fog-like spray to allow a maximum amount of direct evaporation. The total amount of energy required is greatly reduced by the micro-powder 104, which is located within the vessel 101.

The system functions when the rotating impeller 103 stirs the solution of micro-powder and warmed seawater. As already explained, the micro-powder tremendously increases the available surface area for vaporization. At the same time interactions of the water molecules with the particle surfaces reduce water-water interactions to effectively cause a local reduction in the heat of evaporation of the water. This causes greatly accelerated evaporation of water (arrows). The temperature sensors 151a and 151b detect the temperature difference between the vapor and liquid phases and the vessel 101 can be heated, if necessary, (heater not shown) to maintain a temperature differential. The fan 107 circulates the vapor into the condenser 108 where the vapor is converted to liquid water. A check valve (not illustrated) can be provided so that liquid eater can be drawn off into a water collection vessel 120 without releasing the pressure differential caused by the condensation. Additional seawater is sprayed from the sprayer 105 to increase the water vapor pressure within the vessel 101.

Periodically, the concentrated brine accumulating in the vessel 101 is drawn off (not illustrated). The micro-powder is recovered by filtration, centrifugation or simple gravitational settling. In cases where a cellulosic micro-powder is used, it is possible to merely dispose of the used powder since it is fully biodegradable. Generally, the concentrated brine may simply be pumped back into the ocean through a dispersal piping system to avoid excessive local increases in salinity. Alternatively, if there is an available market for the brine, it can be used industrially as a chemical feedstock, for example.

In the illustrated device the vessel 101 is 70×80×100 cm in size. Two motors 102 are set in parallel (only one illustrated) with each motor having a capacity of about 1.5 kWh. The micro-powder 104 is stirred by the impellers 103 at a speed of about 1000 rpm.

The evaporation rate and volume increase with increased rotation and increased temperature. However, temperatures above an optimal value, may cause decomposition of the powder. In this example, the temperature in the vaporization vessel is set to no more than 70° C. Inorganic micro-powders do not decompose at temperatures reached in this device. However, the cellulosic material has superior properties.

The micro-powder stored in vessel 101 can be, for example, a mixture of wood powder 25 kg and silica 5 kg. The mixture was stirred with the impeller 103 while thirteen liters of ocean water was sprayed under the controlled condition of 70° C. As stirring continued, water was lost by evaporation. Ocean water was added to replace the evaporated water, which equaled about 6 l/hour. If the same experiment were conducted without the addition of the micro-powder, less than 1 l/hour would be evaporated. This indicates at least a six-fold improvement due to the micro-powder.

SECOND EXAMPLE

In the second example, contaminated river water was used to emphasize that invention is not limited to the case of ocean water. Pure water can be obtained from any aqueous solution contaminated with non-volatile impurities. For example, irrigation runoff or recycled gray water can readily be desalinated by the present invention.

The basic system was the same as explained in the first example. Only the differences from the first example are detailed. Twenty-five kg of wood micro-powder was placed in the vessel 101 and agitated by the impellers 103. Moreover, the control box 150 was set to 50° C. for the evaporation temperature Rather than ocean water impure water taken from a river was fed through the spray nozzle 105 after being pre-heated to 40° C. Here 10 l of water was initially fed in slowly to prevent a fall of temperature in the vessel. About 2 l/hr of freshwater was obtained from the condenser 108 as a result. If the same experiment were carried out without the wood micro-powder, the amount of pure water produced would be insignificant.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

I claim:

1. A method for accelerating the evaporation of water comprising the steps of:
   making a mixture of water and a quantity of fine particles, the particles having an average diameter of 100 µm or less, wherein the particles are metal oxides selected from the group consisting of alumina, titania, magnesia and iron oxide;
   agitating the mixture within a container at a temperature below the boiling point of water whereby water vapor release from the mixture is accelerated.

2. The method of claim 1 further comprising the step of adding energy during the step of agitating the mixture to maintain a temperature of the mixture.

3. The method of claim 1, wherein the average diameter of the particles is 10 µm or less.

4. The method of claim 3, wherein the average diameter of the particles is 1 µm or less.

5. The method of claim 1, wherein the particles are hydrophilic.

6. The method of claim 1 further comprising the step of spraying additional water into the mixture to replenish evaporated water.

7. The method of claim 6, wherein a temperature of the additional water is adjusted to prevent lowering a temperature of the mixture.

8. The method of claim 1 further comprising the step of providing a system to reduce a pressure in the container.

9. The method of claim 8, wherein the system of reducing a pressure condenses water vapor.

10. An apparatus for accelerating evaporation of water comprising:
    a container holding a mixture of water and fine particles at a temperature below the boiling point of water, wherein the particles have an average diameter of 100 µm or less;
    means for agitating the mixture whereby water vapor release from the mixture is accelerated;
    means for spraying additional water into the mixture to replenish evaporated water; and
    means for adjusting a temperature of the additional water to prevent lowering a temperature of the mixture.

11. The apparatus of claim 10 further comprising means for adding energy to the mixture to maintain a temperature of the mixture while the mixture is being agitated.

12. The apparatus of claim 10, wherein the average diameter of the particles is 10 µm or less.

13. The apparatus of claim 12, wherein the average diameter of the particles is 1 µm or less.

14. The apparatus of claim 10, wherein the particles are composed of a material selected from the group consisting of polysaccharide macromolecules of plant origin, cellulosic macromolecules, proteins, clays, metals, silica and metal oxides.

15. The apparatus of claim 14, wherein the metal oxides are selected from the group consisting of alumina, titania, magnesia and iron oxide.

16. The apparatus of claim 10, wherein the particles are hydrophilic.

17. The apparatus of claim 10 further comprising means for reducing a pressure in the container.

18. The apparatus of claim 17, wherein the means for reducing a pressure condenses water vapor.

19. A method for accelerating the evaporation of water comprising the steps of:
    making a mixture of water and a quantity of fine particles, the particles having an average diameter of 100 µm or less;
    agitating the mixture within a container at a temperature below the boiling point of water whereby water vapor release from the mixture is accelerated
    spraying additional water into the mixture to replenish evaporated water; and
    adjusting a temperature of the additional water to prevent lowering a temperature of the mixture.

20. The method of claim 19, wherein the particles are composed of a material selected from the group consisting of polysaccharide macromolecules of plant origin, cellulosic macromolecules, proteins, clays, metals, silica and metal oxides.

* * * * *